(12) United States Patent
Francis et al.

(10) Patent No.: US 12,639,522 B2
(45) Date of Patent: May 26, 2026

(54) SYSTEMS AND METHODS FOR EMBODIED MULTIMODAL ARTIFICIAL INTELLIGENCE QUESTION ANSWERING AND DIALOGUE WITH COMMONSENSE KNOWLEDGE

(71) Applicant: Robert Bosch GmbH, Stuttgart (DE)

(72) Inventors: Jonathan Francis, Pittsburgh, PA (US);
Alessandro Oltramari, Pittsburgh, PA (US)

(73) Assignee: Robert Bosch GmbH (DE)

( * ) Notice: Subject to any disclaimer, the term of this patent is extended or adjusted under 35 U.S.C. 154(b) by 474 days.

(21) Appl. No.: 17/953,448

(22) Filed: Sep. 27, 2022

(65) Prior Publication Data

US 2024/0104308 A1 Mar. 28, 2024

(51) Int. Cl.

| | |
|---|---|
| *G06F 40/35* | (2020.01) |
| *G06F 40/279* | (2020.01) |
| *G06V 10/22* | (2022.01) |
| *G06V 10/774* | (2022.01) |
| *G06V 10/82* | (2022.01) |
| *G06V 20/50* | (2022.01) |
| *G06V 20/70* | (2022.01) |

(Continued)

(52) U.S. Cl.
CPC ............ *G06F 40/35* (2020.01); *G06F 40/279* (2020.01); *G06V 10/22* (2022.01); *G06V 10/774* (2022.01); *G06V 10/82* (2022.01); *G06V 20/50* (2022.01); *G06V 20/70* (2022.01); *B25J 9/163* (2013.01); *G05D 1/0088* (2013.01)

(58) Field of Classification Search
CPC ........ G06F 40/35; G06F 40/279; G06F 40/30; G06V 20/70; G06V 10/82; G06V 20/50; G06V 10/22; G06V 10/774
See application file for complete search history.

(56) References Cited

U.S. PATENT DOCUMENTS

| | | | | |
|---|---|---|---|---|
| 9,471,559 | B2 * | 10/2016 | Castelli | ................ G06F 16/353 |
| 10,503,739 | B2 * | 12/2019 | Natkin | ............... G06F 16/3329 |
| 10,831,839 | B1 * | 11/2020 | Ogawa | ................. G10L 13/033 |

(Continued)

OTHER PUBLICATIONS

Abhishek Das, Georgia Gkioxari, Stefan Lee, Devi Parikh, Dhruv Batra, "Neural Modular Control for Embodied Question Answering", arXiv:1810.11181v2 [cs.AI] May 2, 2019 (Year: 2019).*

(Continued)

*Primary Examiner* — Fariba Sirjani
*Assistant Examiner* — Nadira Sultana
(74) *Attorney, Agent, or Firm* — Dickinson Wright PLLC

(57) ABSTRACT

A method includes receiving input dialog including a text string corresponding to at least one question and extracting at least one keyword from the text string. The method also includes generating at least one action prediction and providing one or more sub-questions associated with the at least one question. The method also includes receiving one or more answers to the one or more sub-questions, generating at least one sub-goal based on the one or more answers, and traversing an environment based on the at least one sub-goal. The method also includes receiving one or more images associated with the environment, predicting, using the one or more images, an answer to the at least one question, and providing, at an output mechanism, the answer to the at least one question.

20 Claims, 9 Drawing Sheets

(51) Int. Cl.
  *B25J 9/16*       (2006.01)
  *G05D 1/00*       (2006.01)

(56)          References Cited

U.S. PATENT DOCUMENTS

| | | | | |
|---|---|---|---|---|
| 10,878,174 | B1 * | 12/2020 | Vontobel | G06F 40/117 |
| 11,403,571 | B2 * | 8/2022 | Chan | G06Q 10/063112 |
| 11,417,235 | B2 * | 8/2022 | Zhang | G09B 19/04 |
| 12,056,452 | B2 * | 8/2024 | Coman | G06F 40/295 |
| 2018/0133900 | A1 * | 5/2018 | Breazeal | B25J 19/026 |
| 2020/0160199 | A1 * | 5/2020 | Al Hasan | G06N 20/00 |
| 2021/0216576 | A1 * | 7/2021 | Staub | G06Q 30/0282 |
| 2022/0188576 | A1 * | 6/2022 | Vijay | G06F 18/2178 |
| 2023/0133392 | A1 * | 5/2023 | Wang | G06F 40/211 |
| | | | | 704/9 |
| 2023/0316000 | A1 * | 10/2023 | Mukherjee | G06N 3/0475 |
| 2024/0095460 | A1 * | 3/2024 | Xu | G06F 40/30 |

OTHER PUBLICATIONS

Abhishek Das, Samyak Datta, Georgia Gkioxari, Stefan Lee, Devi Parikh, Dhruv Batra, "Embodied Question Answering", IEEE, 2018 (Year: 2018).*

Kaixin Ma, Filip Ilievski, Jonathan Francis, Yonatan Bisk, Eric Nyberg, Alessandro Oltramari, "Knowledge-driven Data Construction for Zero-shot Evaluation in Commonsense Question Answering", The Thirty-Fifth AAAI Conference on Artificial Intelligence (AAAI-21), 2021, pp. 13507-13515 (Year: 2021).*

Fengda Zhu, Yi Zhu, Vincent CS Lee, Xiaodan Liang and Xiaojun Chang, "Deep Learning for Embodied Visual Navigation Research: A Survey", arXiv:2108.04097v4[cs.RO], Oct. 11, 2021 (Year: 2021).*

Brandon Trabucco, Gunnar Sigurdsson, Robinson Piramuthu, Gaurav S. Sukhatme, Ruslan Salakhutdinov, "A Simple Approach for Visual Rearrangement: 3D Mapping and Semantic Search", Aug. 9, 2022, arXiv: 2206.13396v2 [cs.CV] (Year: 2022).*

Bruner, "The Act of Discovery," Harvard Educational Review, vol. 31, 1961, 9 pages.

Das et al., "Embodied Question Answering," Proceedings of the IEEE Conference on Computer Vision and Pattern Recognition, 2018, 10 pages.

Das et al., "Neural Modular Control for Embodied Question Answering," 2nd Conference on Robot Learning (CoRL), 2018, 10 pages.

Francis et al., "Core Challenges in Embodied Vision-Language Planning," arXiv:2106.13948v1, Jun. 2021, 52 pages.

Hardy, "Speaking clearly: A critical review of the self-talk literature," Psychology of Sport and Exercise, vol. 7, 2006, 18 pages.

Krishna et al., "Visual Genome: Connecting Language and Vision Using Crowdsourced Dense Image Annotations," International Journal of Computer Vision, Feb. 2017, 42 pages.

Li et al., "Lexically-constrained Text Generation through Commonsense Knowledge Extraction and Injection," arXiv:2012.10813v1, 2020, 8 pages.

Ma et al., "Knowledge-driven Data Construction for Zero-shot Evaluation in Commonsense Question Answering," The Thirty-Fifth AAAI Conference on Artificial Intelligence (AAAI-21), 2021, 9 pages.

Ma et al., "Towards Generalizable Neuro-Symbolic Systems for Commonsense Question Answering," arXiv:1910.14087v1, 2019, 11 pages.

Oltramari et al., "Neuro-symbolic Architectures for Context Understanding," arXiv:2003.04707v1, 2020, 18 pages.

Shevchenko et al., "Reasoning over Vision and Language: Exploring the Benefits of Supplemental Knowledge," arXiv:2101.06013v1, 2021, 17 pages.

Shwartz et al., "Unsupervised Commonsense Question Answering with Self-Talk," arXiv:2004.05483v2, 2020, 15 pages.

Speer et al., "ConceptNet 5.5: An Open Multilingual Graph of General Knowledge," Proceedings of the Thirty-First AAAI Conference on Artificial Intelligence (AAAI-17), 2017, 8 pages.

Yang et al., "Visual Semantic Navigation Using Scene Priors," arXiv:1810.06543v1, 2018, 14 pages.

* cited by examiner $Q_0$ : What color is the car?

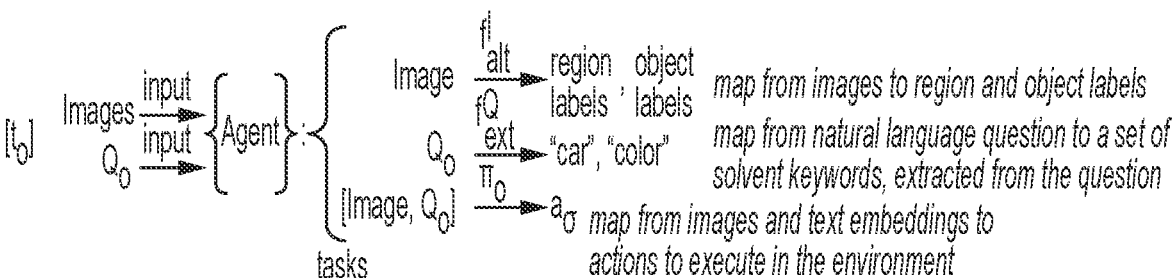

map from images to region and object labels map from natural language question to a set of solvent keywords, extracted from the question map from images and text embeddings to actions to execute in the environment

FIG. 3A

Self-talk Agent <KBs, LMs> garage
located at
car for KBs:
(cars, located At, garage)
(cars, located At, driveway)
(cars, located At, street)
grounded triples "Where are cars located?"

for LMs: garage, driveway, street     relevant keywords for question $Q_0$

Images —input→ { Agent } :
$Q_0$ —input→
Keywords →

Image —$f_{alt}$→ object labels, region labels grounded triplets , $Q_0$ —templates→ "navigate to garage", "navigate to driveway", "navigate to street"     grounded subgoal "instructions"

Image, $Q_0$ —$\pi(k)$→ $a_i$ $Q_0$ —query→ {M} —retrieve→ "driveway"     relevant keywords from past experience on similar prompts (object labels, region labels) grounded subgoal instructions —$f_{sim}$→ progress score     Determines when to query self-talk agent again or when to ask oracle for help $Q_0$, relevant keywords, object labels, region labels —$f_{sim}$→ $Q_1...$, $Q_M...$, $Q_N$ $Q_0$, "garage", reward —store→ {M}     store keyword from successful subgoal in memory tasks

FIG. 3B

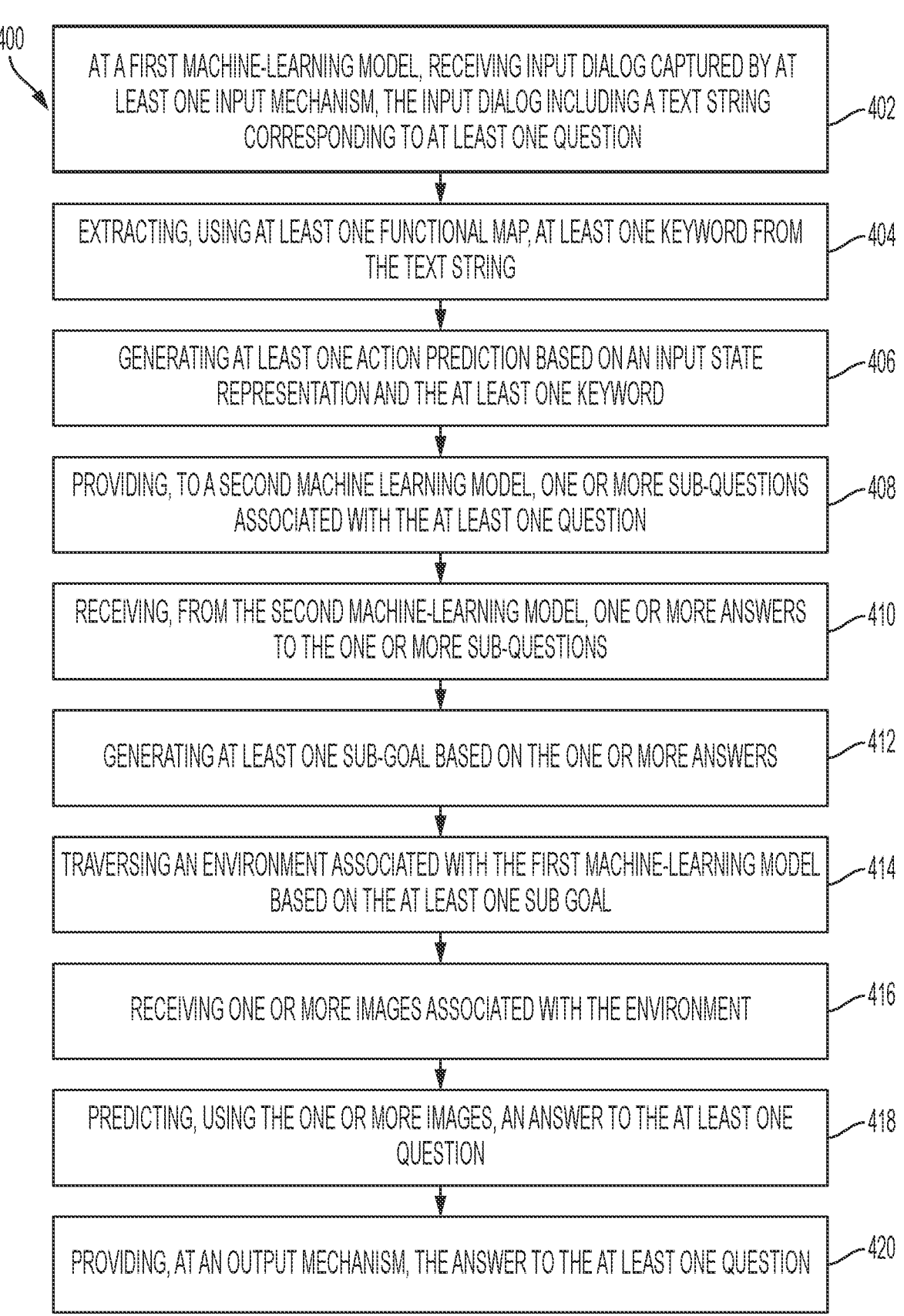

400

AT A FIRST MACHINE-LEARNING MODEL, RECEIVING INPUT DIALOG CAPTURED BY AT LEAST ONE INPUT MECHANISM, THE INPUT DIALOG INCLUDING A TEXT STRING CORRESPONDING TO AT LEAST ONE QUESTION — 402

EXTRACTING, USING AT LEAST ONE FUNCTIONAL MAP, AT LEAST ONE KEYWORD FROM THE TEXT STRING — 404

GENERATING AT LEAST ONE ACTION PREDICTION BASED ON AN INPUT STATE REPRESENTATION AND THE AT LEAST ONE KEYWORD — 406

PROVIDING, TO A SECOND MACHINE LEARNING MODEL, ONE OR MORE SUB-QUESTIONS ASSOCIATED WITH THE AT LEAST ONE QUESTION — 408

RECEIVING, FROM THE SECOND MACHINE-LEARNING MODEL, ONE OR MORE ANSWERS TO THE ONE OR MORE SUB-QUESTIONS — 410

GENERATING AT LEAST ONE SUB-GOAL BASED ON THE ONE OR MORE ANSWERS — 412

TRAVERSING AN ENVIRONMENT ASSOCIATED WITH THE FIRST MACHINE-LEARNING MODEL BASED ON THE AT LEAST ONE SUB GOAL — 414

RECEIVING ONE OR MORE IMAGES ASSOCIATED WITH THE ENVIRONMENT — 416

PREDICTING, USING THE ONE OR MORE IMAGES, AN ANSWER TO THE AT LEAST ONE QUESTION — 418

PROVIDING, AT AN OUTPUT MECHANISM, THE ANSWER TO THE AT LEAST ONE QUESTION — 420

FIG. 4

SYSTEMS AND METHODS FOR EMBODIED MULTIMODAL ARTIFICIAL INTELLIGENCE QUESTION ANSWERING AND DIALOGUE WITH COMMONSENSE KNOWLEDGE

TECHNICAL FIELD

The present disclosure relates to the question answering using artificial intelligence, and in particular to systems and methods for embodied multimodal artificial intelligence question answering and dialog with common knowledge.

BACKGROUND

Generalization to unseen environments remains a challenge for all forms of artificial intelligence. This is especially true of embodied mobile-manipulation agents (e.g., robots that include artificial intelligence engines configured to use various machine-learning models), which may include entities with physical embodiments that must interact with an environment (e.g., navigating the environment, manipulating objects, communicating with other agents, and the like), in order to understand its context, reason about it, and learn from it. When much of the experience of the agent experience (e.g., during model training or policy optimization) has consisted of just a few geospatial scenes, a restricted set of objects, or very simple dialogues and/or question-answer interactions, models tend to over fit to these training distributions.

Typically, when a machine-learning model can successfully maximize performance (e.g., insofar as the machine-learning model remains within this training domain), the machine-learning model may become confused when placed in new geospatial scenes (e.g., when the machine-learning model must interact with, or locate, new objects for which the machine-learning model does not know the properties/attributes associated therewith, and/or when the machine-learning model is presented with noisy instructions or questions with new grammatical structure). Such agents are typically unable to generalize to these unseen contexts, using experience and pattern-matching strategies alone.

SUMMARY

An aspect of the disclosed embodiments includes a method for multimodal question answering using artificial intelligence. The method includes, at a first machine-learning model: receiving input dialog, the input dialog including a text string corresponding to at least one question; extracting, using at least one functional map, at least one keyword from the text string; generating at least one action prediction based on an input state representation and the at least one keyword; providing, to a second machine-learning model, one or more sub-questions associated with the at least one question; receiving, from the second machine-learning model, one or more answers to the one or more sub-questions; generating at least one sub-goal based on the one or more answers; traversing an environment associated with the first machine-learning model based on the at least one sub-goal; receiving one or more images associated with the environment; predicting, using the one or more images, an answer to the at least one question; and providing, at an output mechanism, the answer to the at least one question.

Another aspect of the disclosed embodiments includes a system for multimodal question answering using artificial intelligence. The system includes a processor and a memory. The memory includes instructions that, when executed by the processor, cause the processor to use a first machine-learning model to: receive input dialog, the input dialog including a text string corresponding to at least one question; extract, using at least one functional map, at least one keyword from the text string; generate at least one action prediction based on an input state representation and the at least one keyword; provide, to a second machine-learning model, one or more sub-questions associated with the at least one question; generate at least one sub-goal based on one or more answers received responsive to the one or more sub-questions; traverse an environment associated with the first machine-learning model based on the at least one sub-goal; receive one or more images associated with the environment; and predict, using the one or more images, an answer to the at least one question.

Another aspect of the disclosed embodiments includes an autonomous apparatus. The autonomous apparatus includes a processor and a memory. The memory includes instructions that, when executed by the processor, cause the processor to use a first machine-learning model initially trained using first training data to: receive input dialog, the input dialog including a text string corresponding to at least one question; extract, using at least one functional map that correlates one or more maps associated with one or more image inputs with corresponding region and object labels, at least one keyword from the text string; generate at least one action prediction based on an input state representation and the at least one keyword; provide, to a second machine-learning model, one or more sub-questions associated with the at least one question; generate at least one sub-goal based on one or more answers received responsive to the one or more sub-questions; traverse an environment associated with the first machine-learning model based on the at least one sub-goal; receive one or more images associated with the environment; predict, using the one or more images, an answer to the at least one question; receive, responsive to providing the answer to the at least one question at an output mechanism, feedback associated with the answer to the at least one question; and train the first machine-learning model using second training data, the second training data being based on the first training data and at least the feedback associated with the answer to the at least one question.

BRIEF DESCRIPTION OF THE DRAWINGS

FIG. 3 generally illustrates an embodied multimodal artificial intelligence question answering process flow, according to the principles of the present disclosure.

FIG. 4 is a flow diagram generally illustrating multimodal question answering method, according to the principles of the present disclosure.

DETAILED DESCRIPTION

Figure 1:
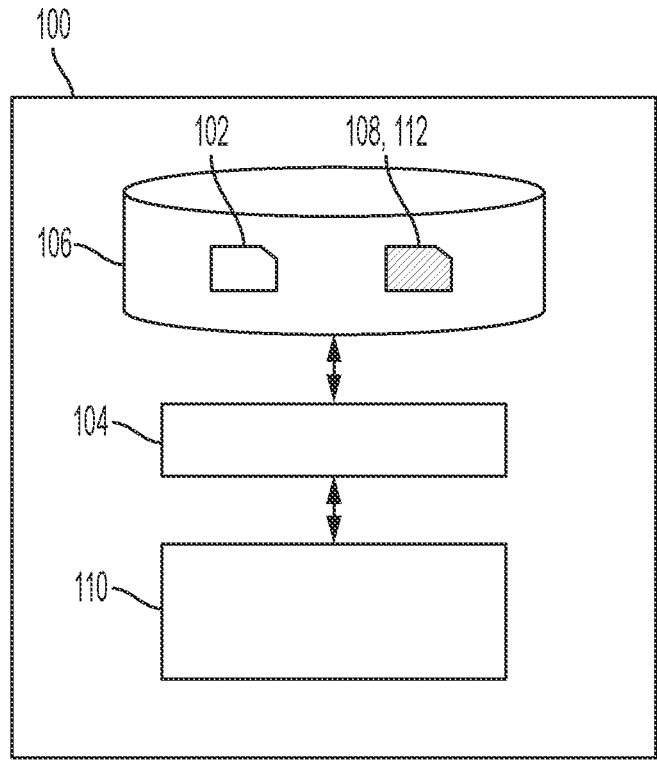
FIG. 1 generally illustrates a system for training a neural network, according to the principles of the present disclosure.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

As described, generalization to unseen environments remains a challenge for all forms of artificial intelligence. This is especially true of embodied mobile-manipulation agents (e.g., robots that include artificial intelligence engines configured to use various machine-learning models), which may include entities with physical embodiments that must interact with an environment (e.g., navigating the environment, manipulating objects, communicating with other agents, and the like), in order to understand its context, reason about it, and learn from it. When much of the experience of the agent experience (e.g., during model training or policy optimization) has consisted of just a few geospatial scenes, a restricted set of objects, or very simple dialogues and/or question-answer interactions, models tend to over fit to these training distributions.

Typically, when a machine-learning model can successfully maximize performance (e.g., insofar as the machine-learning model remains within this training domain), the machine-learning model may become confused when placed in new geospatial scenes (e.g., when the machine-learning model must interact with, or locate, new objects for which the machine-learning model does not know the properties/attributes associated therewith, and/or when the machine-learning model is presented with noisy instructions or questions with new grammatical structure). Such agents are typically unable to generalize to these unseen contexts, using experience and pattern-matching strategies alone.

In some scenarios, machine-learning model or agent generalization may be aided by the use of external domain knowledge, such as spatial and commonsense knowledge, typically available as external resources in the form of ontologies and knowledge graphs. Agents that are encouraged to learn reasoning strategies, on top of this domain knowledge, perform better than those that simply perform statistical pattern-matching (e.g., probabilistic modeling, neural functional approximation).

Accordingly, systems and methods, such as the systems and methods described herein, configured to use hybrid modeling (or "neuro-symbolism"), combining the strengths of both symbolic reasoning and statistical prediction, may be desirable. In some embodiments, the systems and methods described herein may be configured to define strategies for: (i) extracting commonsense knowledge from external resources, (ii) injecting this knowledge into neural embodied agents for robot navigation and manipulation tasks, and (iii) training agents to both reason and perform pattern-matching.

The systems and methods described herein may be configured to provide a neuro-symbolic solution to the artificial intelligence task of embodied question-answering. The systems and methods described herein may be configured to use an agent, which may interact with either a simulated or real environment (e.g., through navigating and/or exploring the environment, manipulating objects, communicating with other agents in the environment), in order to collect sufficient world knowledge for answering questions or engaging in grounded dialogue. The systems and methods described herein may be configured to introduce knowledge manipulation strategies for mixed navigation and manipulation scenarios (e.g., mobile manipulation), enabling the following capabilities in agents: active sub-goal discovery (decomposing high-level tasks into more tractable steps), generating scene priors (allows for structured exploration), and commonsense reasoning.

The systems and methods described herein may be configured to perform embodied question-answering (EQA) task (e.g., which are associated with a family of embodied vision-language planning (EVLP) tasks in artificial intelligence). The systems and methods described herein may be configured to spawn an agent (e.g., which may be referred to herein as an ego-age, a machine-learning model, and the like) in a random location of a simulated environment. The systems and methods described herein may be configured to present the agent with a natural language question. The systems and methods described herein may be configured to explore, using the agent, an associated environment to collect sufficient information and/or experience for answering the question correctly. Because the agent figures out those navigation and manipulation actions (e.g. for collecting said experience), EQA differs from conventional instruction-following tasks, where there already exists implicit alignment between instructions and associated ground-truth navigation trajectories (e.g., in instruction-following tasks, instructions tend to fully describe the sequence of actions that the agent must execute).

Despite this not being the case in EQA, contemporary approaches still seek to address EQA tasks as instruction-following tasks and, consequently, receive low performance on navigation and QA accuracy metrics. Accordingly, the systems and methods described herein may be configured to leverage external information to plan viable subtasks. The systems and methods described herein may be configured to develop and/or use a knowledge-enhanced system for embodied reasoning and interaction. The systems and methods described herein may be configured to provide active sub-goal discovery. The systems and methods described herein may be configured to, when given a high-level instruction or question, leverages (e.g., using the agent) commonsense and spatial knowledge to decompose the task into more tractable subtasks.

The systems and methods described herein may be configured to leveraging scene priors. The systems and methods described herein may be configured to, when the agent needs to find an object, calculate, using the agent, a statistical distribution of belief over the set of least-likely to most-likely regions where that object might be found (e.g., by leveraging object-region relationships captured by a knowledge graph and a pre-train visual classifier).

The systems and methods described herein may be configured to perform knowledge-driven question-answering. The systems and methods described herein may be configured to, when asked questions about unseen objects, the use the agent to leverage commonsense and spatial knowledge for reasoning of properties and/or locations of the new objects.

In some embodiments, the systems and methods described herein may be configured to, when given a high-level instruction or question, use the agent to the leverage commonsense and spatial knowledge to decompose the implicit navigation and/or manipulation task into tractable subtasks. For example, if the agent is initialized in the living room of a home then asked the question, "What color is the car?", the agent may generate a plan for, first, searching for the car in the garage or outside the house on the driveway. The systems and methods described herein may be configured to adopt an iterative self-talk paradigm for conceptual discovery, where the agent is able to ask itself where questions (e.g., about objects such as cars) and how questions (e.g., about reaching a particular location, such as the garage, the driveway, and the like). The systems and methods described herein may be configured to answer these questions using the appropriate external knowledge resources that encode object-object, object-region, region-region relationships, and/or the like. The responses to these self-talk queries (e.g., cars are located in garages, cars are located in the driveway, cars are located on streets) indicate intermediate navigation sub-goals for the agent (e.g., navigate to the garage, navigate to the driveway, navigate to the street).

The systems and methods described herein may be configured to, when using the agent to find an object, use the agent calculates a statistical distribution of belief over the set of least-likely to most-likely regions where that object might be found. The systems and methods described herein may be configured to use the agent to leverage object-region relationships captured by a knowledge graph and a pre-trained visual classifier. This allows for more efficient exploration, compared to breadth-first search (BFS), depth-first search (DFS), and other classical search algorithms. The systems and methods described herein may be configured to generate a custom domain knowledge-graph, which captures the regions and objects that the agent is likely to encounter. The systems and methods described herein may be configured to extend this knowledge graph, using public resources, to obtain additional connections to other likely objects and regions. The systems and methods described herein may be configured to using this custom knowledge-graph, train a graph convolutional network to produce a semantics-aware and spatially-aware representation, which provides a rich state description, in the form of a latent vector embedding. This state embedding is to be used as an input to downstream components of the machine-learning model associated with the agent, such as the navigation/manipulation policy.

In some embodiments, the systems and methods described herein may be configured to provide knowledge-driven question-answering. The systems and methods described herein may be configured to, when asked questions about unseen objects, use the agent to leverage commonsense and spatial knowledge of the agent for reasoning about properties and locations of the new objects. For example, if the agent is spawned in a bedroom and asked the question, "Where is the television located?", the agent may not navigate the environment to explore, but can rely of the knowledge of object properties and locations and can offer initial predictions of {bedroom, living room, den}, instead.

As is generally illustrated in FIG. 3, the systems and methods described herein may be configured to provide multimodal question answering using artificial intelligence. For example, at some initial timestep $t=t_0$, an agent ("ego-agent") is initialized in the environment and is presented with a question, such as "What color is the car?", and may perform a series of internal subtasks, which facilitate the interaction of the ego-agent with the environment. The agent may utilize $$f_{cif}^I,$$

which is a single or a collection of functional mappings (e.g., neural functional approximators, such as encoders, decoders, prediction heads, nonlinear activation, and/or the like), which may map from image inputs (e.g., red-green-blue (RGB) and/or depth information and/or semantic segmentation) to region and object labels (e.g., which may include region and object classifiers). Concurrently or substantially concurrently, $$f_{ext}^Q$$

extracts salient keywords from the original question, and policy $\pi$ predicts actions from an input state representation. Throughout the interaction of the ego-agent with the environment, $\pi$ is periodically updated (e.g., from initialization $\pi_0$ to some parameterization $\pi^{(k)}$), through policy gradient updates, based on downstream episodic rewards. The episodic rewards may be provided to the ego-agent by the environment, based on the degree of task completion (e.g., navigation to a desired location or accuracy in answering the question).

For $t=t_i$, the ego-agent interacts with a self-talk agent, which may leverage a knowledge-graph or a pre-trained language model. The self-talk agent receives queries (e.g., which may be referred to herein as sub-questions) from the ego-agent (e.g., such as "Where are cars located?") and provides responses in accordance with explicit or implicit knowledge (KBs: [cars, at Location, driveway]"; LMs: [garage, driveway, street]) of the self-talk agent. Based on these responses (e.g., knowledge-grounded context), the ego-agent may generate sub-goal specifications, which aid in interaction with the environment. The ego-agent may retrieve from a memory module M, which stores keywords that were relevant to questions similar to initial question $Q_0$. The similarity function $f_{sim}$ compares the sub-goals and the object and/or region labels from current visual context of the ego-agent. A resultant similarity score provides a strong basis for progress-monitoring capabilities, which may be a property that is largely missing from many EVLP solutions. Based on this progress score, the ego-agent uses a natural language generation module $f_{gen}$ to generate N clarification questions $\{Q_1, \ldots, Q_m, \ldots Q_N\}$, throughout task execution, directed to the self-talk agent or an interactive dialogue agent. At the end of each episode, once the reward is calculated for having successfully completed the EQA task (or not), the agent stores in M the original question $Q_0$, the episodic reward, and relevant keywords from the most successful sub-goal.

In some embodiments, the systems and methods described herein may be configured to use knowledge graphs in neural mobile-manipulation agents. The systems and methods described herein may be configured to generate sub-goals from natural language questions, knowledge, and visual context. The systems and methods described herein may be configured to perform commonsense and/or spatial reasoning in a physical environment. The systems and methods described herein may be configured to use scene priors in embodied question-answering.

In some embodiments, the systems and methods described herein may be configured to, at a first machine-learning model, receive input dialog. The input dialog may include a text string corresponding to at least one question. The input dialog may be provided to the first machine-learning model using an input mechanism or device, such as a microphone (e.g., providing verbal input), a keyboard (e.g., providing textual input), and/or the like. The first machine-learning model may be referred to as an ego-agent and may be associated with any suitable autonomous or semi-autonomous mobile machine. The mobile machine may include a robot, vehicle, and/or any other suitable machine, such as those described herein or any other suitable machine.

The systems and methods described herein may be configured to extract, using at least one functional map, at least one keyword from the text string. The at least one functional map may correspond to a neural functional approximator and/or may correlate one or more maps associated with one or more image inputs with corresponding region and object labels. The systems and methods described herein may be configured to generate at least one action prediction based on an input state representation and the at least one keyword. The at least one action prediction may include an action to navigate at least a portion of the environment associated with the first machine-learning model and/or other suitable action. The systems and methods described herein may be configured to predict any suitable number of actions for traversing the environment and/or for answering the question.

The systems and methods described herein may be configured to provide, to a second machine-learning model (e.g., which may be referred to as a self-talk agent), one or more sub-questions associated with the at least one question. The systems and methods described herein may be configured to receive, from the second machine-learning model, one or more answers to the one or more sub-questions. The systems and methods described herein may be configured to generate at least one sub-goal based on the one or more answers. The systems and methods described herein may be configured to traverse an environment associated with the first machine-learning model based on the at least one sub-goal and/or at least one downstream episodic reward.

The systems and methods described herein may be configured to receive one or more images associated with the environment. The one or more image inputs may include one or more of a red-green-blue input, a depth information input, a semantic segmentation input, other suitable input, or a combination thereof. The one or more images may be received from an image capturing device associated with the first machine-learning model. The systems and methods described herein may be configured to predict, using the one or more images, an answer to the at least one question. The systems and methods described herein may be configured to provide, at an output mechanism, the answer to the at least one question. The output mechanism may include a visual output mechanism, an audio output mechanism, and/or any other suitable output mechanism.

The systems and methods described herein may be configured to store, in an associated memory, the text string, the answered to the at least one question, the at least one sub-goal, any other suitable date or information, or a combination thereof. The systems and methods described herein may be configured to receive feedback in response to providing, at the output mechanism, the answer to the at least one question. The systems and methods described herein may be configured to train the first machine-learning model based on the feedback.

FIG. 1 shows a system 100 for training a neural network. The system 100 may comprise an input interface for accessing training data 102 for the neural network. For example, as illustrated in FIG. 1, the input interface may be constituted by a data storage interface 104 which may access the training data 102 from a data storage 106. For example, the data storage interface 104 may be a memory interface or a persistent storage interface, e.g., a hard disk or an SSD interface, but also a personal, local or wide area network interface such as a Bluetooth, Zigbee or Wi-Fi interface or an ethernet or fiberoptic interface. The data storage 106 may be an internal data storage of the system 100, such as a hard drive or SSD, but also an external data storage, e.g., a network-accessible data storage.

In some embodiments, the data storage 106 may further comprise a data representation 108 of an untrained version of the neural network which may be accessed by the system 100 from the data storage 106. It will be appreciated, however, that the training data 102 and the data representation 108 of the untrained neural network may also each be accessed from a different data storage, e.g., via a different subsystem of the data storage interface 104. Each subsystem may be of a type as is described above for the data storage interface 104.

In some embodiments, the data representation 108 of the untrained neural network may be internally generated by the system 100 on the basis of design parameters for the neural network, and therefore may not explicitly be stored on the data storage 106. The system 100 may further comprise a processor subsystem 110 which may be configured to, during operation of the system 100, provide an iterative function as a substitute for a stack of layers of the neural network to be trained. Here, respective layers of the stack of layers being substituted may have mutually shared weights and may receive as input an output of a previous layer, or for a first layer of the stack of layers, an initial activation, and a part of the input of the stack of layers.

The processor subsystem 110 may be further configured to iteratively train the neural network using the training data 102. Here, an iteration of the training by the processor subsystem 110 may comprise a forward propagation part and a backward propagation part. The processor subsystem 110 may be configured to perform the forward propagation part by, amongst other operations defining the forward propagation part which may be performed, determining an equilibrium point of the iterative function at which the iterative function converges to a fixed point, wherein determining the equilibrium point comprises using a numerical root-finding algorithm to find a root solution for the iterative function minus its input, and by providing the equilibrium point as a substitute for an output of the stack of layers in the neural network.

The system 100 may further comprise an output interface for outputting a data representation 112 of the trained neural network, this data may also be referred to as trained model data 112. For example, as also illustrated in FIG. 1, the output interface may be constituted by the data storage interface 104, with said interface being in these embodiments an input/output ('IO') interface, via which the trained model data 112 may be stored in the data storage 106. For example, the data representation 108 defining the 'untrained' neural network may during or after the training be replaced, at least in part by the data representation 112 of the trained neural network, in that the parameters of the neural network, such as weights, hyperparameters and other types of parameters of neural networks, may be adapted to reflect the training on the training data 102. This is also illustrated in FIG. 1 by the reference numerals 108, 112 referring to the same data record on the data storage 106. In some embodiments, the data representation 112 may be stored separately from the data representation 108 defining the 'untrained' neural network. In some embodiments, the output interface may be separate from the data storage interface 104, but may in general be of a type as described above for the data storage interface 104.

Figure 2:
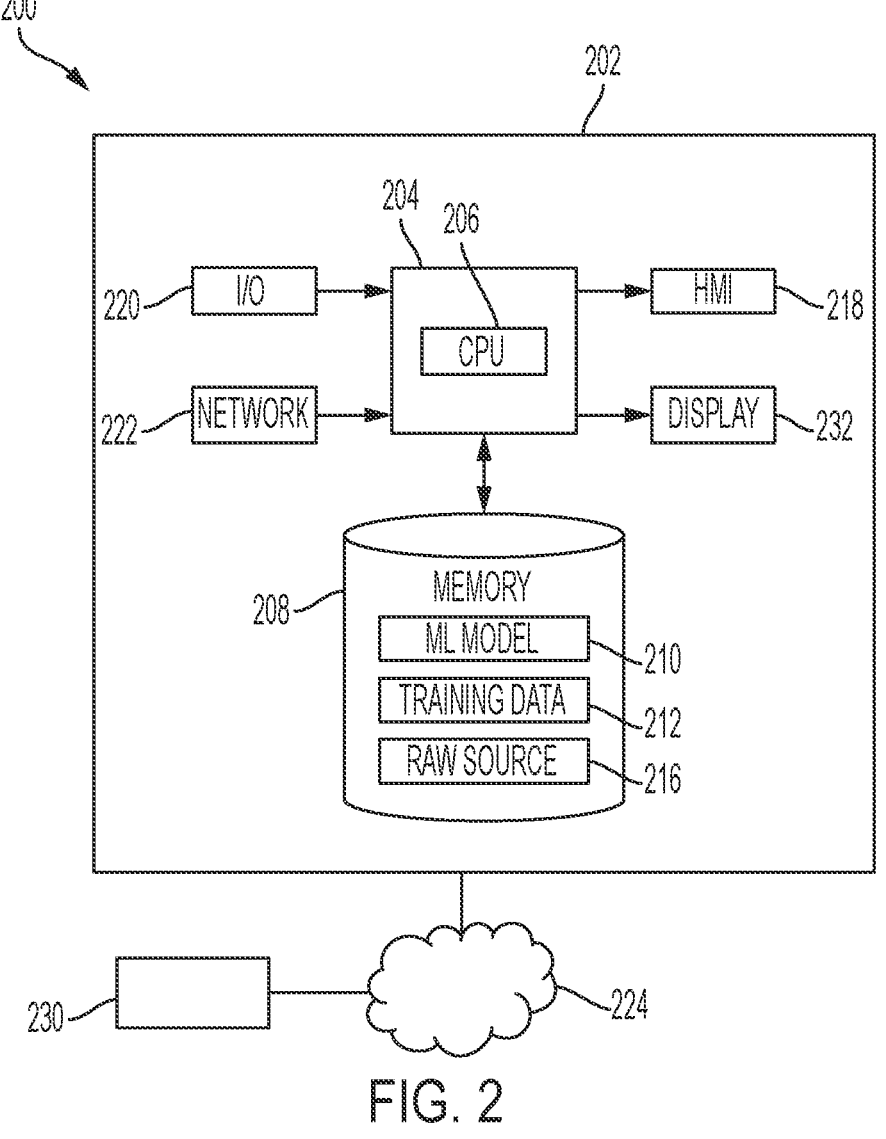
FIG. 2 generally illustrates a computer-implemented method for training and utilizing a neural network, according the principles of the present disclosure.

FIG. 2 generally illustrates a data annotation/augmentation system 200 configured to provide embodied multimodal artificial intelligence question answering. The system 200 may include at least one computing system 202. The computing system 202 may include at least one processor 204 that is operatively connected to a memory unit 208. The processor 204 may include one or more integrated circuits that implement the functionality of a central processing unit (CPU) 206. The CPU 206 may be a commercially available processing unit that implements an instruction stet such as one of the x86, ARM, Power, or MIPS instruction set families.

During operation, the CPU 206 may execute stored program instructions that are retrieved from the memory unit 208. The stored program instructions may include software that controls operation of the CPU 206 to perform the operation described herein. In some embodiments, the processor 204 may be a system on a chip (SoC) that integrates functionality of the CPU 206, the memory unit 208, a network interface, and input/output interfaces into a single integrated device. The computing system 202 may implement an operating system for managing various aspects of the operation.

The memory unit 208 may include volatile memory and non-volatile memory for storing instructions and data. The non-volatile memory may include solid-state memories, such as NAND flash memory, magnetic and optical storage media, or any other suitable data storage device that retains data when the computing system 202 is deactivated or loses electrical power. The volatile memory may include static and dynamic random-access memory (RAM) that stores program instructions and data. For example, the memory unit 208 may store a machine-learning model 210 (e.g., represented in FIG. 2 as the ML Model 210) or algorithm, a training dataset 212 for the machine-learning model 210, raw source dataset 216.

The computing system 202 may include a network interface device 222 that is configured to provide communication with external systems and devices. For example, the network interface device 222 may include a wired and/or wireless Ethernet interface as defined by Institute of Electrical and Electronics Engineers (IEEE) 802.11 family of standards. The network interface device 222 may include a cellular communication interface for communicating with a cellular network (e.g., 3G, 4G, 5G). The network interface device 222 may be further configured to provide a communication interface to an external network 224 or cloud.

The external network 224 may be referred to as the world-wide web or the Internet. The external network 224 may establish a standard communication protocol between computing devices. The external network 224 may allow information and data to be easily exchanged between computing devices and networks. One or more servers 230 may be in communication with the external network 224.

The computing system 202 may include an input/output (I/O) interface 220 that may be configured to provide digital and/or analog inputs and outputs. The I/O interface 220 may include additional serial interfaces for communicating with external devices (e.g., Universal Serial Bus (USB) interface).

The computing system 202 may include a human-machine interface (HMI) device 218 that may include any device that enables the system 200 to receive control input. Examples of input devices may include human interface inputs such as keyboards, mice, touchscreens, voice input devices, and other similar devices. The computing system 202 may include a display device 232. The computing system 202 may include hardware and software for outputting graphics and text information to the display device 232. The display device 232 may include an electronic display screen, projector, printer or other suitable device for displaying information to a user or operator. The computing system 202 may be further configured to allow interaction with remote HMI and remote display devices via the network interface device 222.)

The system 200 may be implemented using one or multiple computing systems. While the example depicts a single computing system 202 that implements all of the described features, it is intended that various features and functions may be separated and implemented by multiple computing units in communication with one another. The particular system architecture selected may depend on a variety of factors.

The system 200 may implement a machine-learning model 210 (e.g., which may be referred to as the machine-learning algorithm 210) that is configured to analyze the raw source dataset 216. The raw source dataset 216 may include raw or unprocessed sensor data that may be representative of an input dataset for a machine-learning system. The raw source dataset 216 may include video, video segments, images, text-based information, and raw or partially processed sensor data (e.g., radar map of objects). In some embodiments, the machine-learning model 210 may be a neural network algorithm that is designed to perform a predetermined function. For example, the neural network algorithm may be configured in automotive applications to identify pedestrians in video images.

The computer system 200 may store a training dataset 212 for the machine-learning model 210. The training dataset 212 may represent a set of previously constructed data for training the machine-learning model 210. The training dataset 212 may be used by the machine-learning model 210 to learn weighting factors associated with a neural network algorithm. The training dataset 212 may include a set of source data that has corresponding outcomes or results that the machine-learning model 210 tries to duplicate via the learning process. In this example, the training dataset 212 may include question answering data, environmental data, dialog data, other suitable data, and/or the like.

The machine-learning model 210 may be operated in a learning mode using the training dataset 212 as input. The machine-learning model 210 may be executed over a number of iterations using the data from the training dataset 212. With each iteration, the machine-learning model 210 may update internal weighting factors based on the achieved results. For example, the machine-learning model 210 can compare output results (e.g., annotations) with those included in the training dataset 212. Since the training dataset 212 includes the expected results, the machine-learning model 210 can determine when performance is acceptable. After the machine-learning model 210 achieves a predetermined performance level (e.g., 100% agreement with the outcomes associated with the training dataset 212), the machine-learning model 210 may be executed using data that is not in the training dataset 212. The trained machine-learning model 210 may be applied to new datasets to answer various questions put to the machine-learning model 210.

The machine-learning model 210 may be configured to identify a particular feature in the raw source data 216. The raw source data 216 may include a plurality of instances or input dataset for which various predictions are desired. The machine-learning model 210 may be programmed to process the raw source data 216 to identify the presence of the particular features. The machine-learning model 210 may be configured to predict, using the raw source data 216, one or more answers to one or more questions. The raw source data 216 may be derived from a variety of sources. For example, the raw source data 216 may be actual input data collected by a machine-learning system. The raw source data 216 may be machine generated for testing the system.

In the example, the machine-learning model 210 may process raw source data 216 and output an answer to a question. The machine-learning model 210 may generate a confidence level (e.g., a certainty value) or factor for each output generated. For example, a confidence value that exceeds a predetermined high-confidence threshold may indicate that the machine-learning model 210 is confident that the answer prediction will result in a desired answer. A confidence value that is less than a low-confidence threshold may indicate that the machine-learning model 210 has some uncertainty that the answer prediction will result in the desired answer.

In some embodiments, the system 200 may, using a machine-learning model, such as the machine-learning model 210, receive input dialog captured by an input mechanism (e.g., such as a microphone, keyboard, and/or any other suitable input mechanism). The input dialog may include a text string corresponding to a question.

The system 200, using the machine-learning model 210, may extract, using at least one functional map, at least one keyword from the text string. The at least one functional map may correspond to a neural functional approximator and/or may correlate one or more maps associated with one or more image inputs with corresponding region and object labels. The system 200, using the machine-learning model 210, may generate at least one action prediction based on an input state representation and the at least one keyword. The at least one action prediction may include an action to navigate at least a portion of the environment associated with the machine-learning model 210 and/or other suitable action. The system 200 may predict any suitable number of actions for traversing the environment and/or for answering the question.

The system 200 may provide, to a second machine-learning model, one or more sub-questions associated with the at least one question. The system 299 may receive, from the second machine-learning model at the machine-learning model 210, one or more answers to the one or more sub-questions. The system 200, using the machine-learning model 210, may generate at least one sub-goal based on the one or more answers. The system 200 may traverse an environment based on the at least one sub-goal and/or at least one downstream episodic reward.

The system 200 may receive, via an image capturing device, one or more images associated with the environment. The system 200, using the machine-learning model 210, may predict, using the one or more images, an answer to the question. The system 200 may provide, at an output mechanism (e.g., such as the display 232, HMI 218, I/o 220, or any other suitable mechanism), the answer to the question.

The system 200 may store, in an associated memory, such as the memory 208 or other suitable memory, the text string, the answered to the at least one question, the at least one sub-goal, any other suitable date or information, or a combination thereof. The system 200 may receive feedback in response to providing the answer to the question. For example, a user of the system 200 may provide verbal, textual or other suitable feedback (e.g., as an input) based on the perspective of the user that the answer to the question is accurate or correct. The system 200 may subsequently train the machine-learning model 210 based on the feedback (e.g., in order to improve future predations).

It should be understood that the systems and methods described herein may be configured to perform any suitable function, such as those described herein with respect to FIGS. 6-11.

FIG. 4 is a flow diagram generally illustrating multimodal question answering method 400 according to the principles of the present disclosure. At 402, the method 400, at a first machine-learning model receives input dialog captured by at least one input mechanism, the input dialog including a text string corresponding to at least one question. For example, the system 200, using the machine-learning model 210, may receive the input dialog from at least one input mechanism (e.g., such as those described herein).

At 404, the method 400 extracts, using at least one functional map, at least one keyword from the text string. For example, the system 200, using the machine-learning model 210, may extract, using the at least one functional map, the at least one keyword from the text string.

At 406, the method 400 generates at least one action prediction based on an input state representation and the at least one keyword. For example, the system 200, using the machine-learning model 210, may generate the at least one action prediction based on the input state representation and the at least one keyword.

At 408, the method 400 provides, to a second machine-learning model, one or more sub-questions associated with the at least one question. For example, the system 200, using the machine-learning model 210, may provide, to the second machine-learning model, the one or more sub-questions associated with the at least one question.

At 410, the method 400 receives, from the second machine-learning model, one or more answers to the one or more sub-questions. For example, the system 200, using the machine-learning model 210, may receive, from the second machine-learning model, the one or more answers to the one or more sub-questions.

At 412, the method 400 generates at least one sub-goal based on the one or more answers. For example, the system 200, using the machine-learning model 210, may generate the at least one sub-goal based on the one or more answers.

At 414, the method 400 traverses an environment associated with the first machine-learning model based on the at least one sub-goal. For example, the system 200, using the machine-learning model 210, may traverse the environment based on the at least one sub-goal.

At 416, the method 400 receives one or more images associated with the environment. For example, the system 200, using the machine-learning model 210, may receive the one or more images associated with the environment.

At 418, the method 400 predicts, using the one or more images, an answer to the at least one question. For example, the system 200, using the machine-learning model 210, may predict, using the one or more images, the answer to the at least one question.

At 420, the method 400 provides, at an output mechanism, the answer to the at least one question. For example, the system 200, using the machine-learning model 210, may provide, at the output mechanism, the answer to the at least one question.

Figure 5:
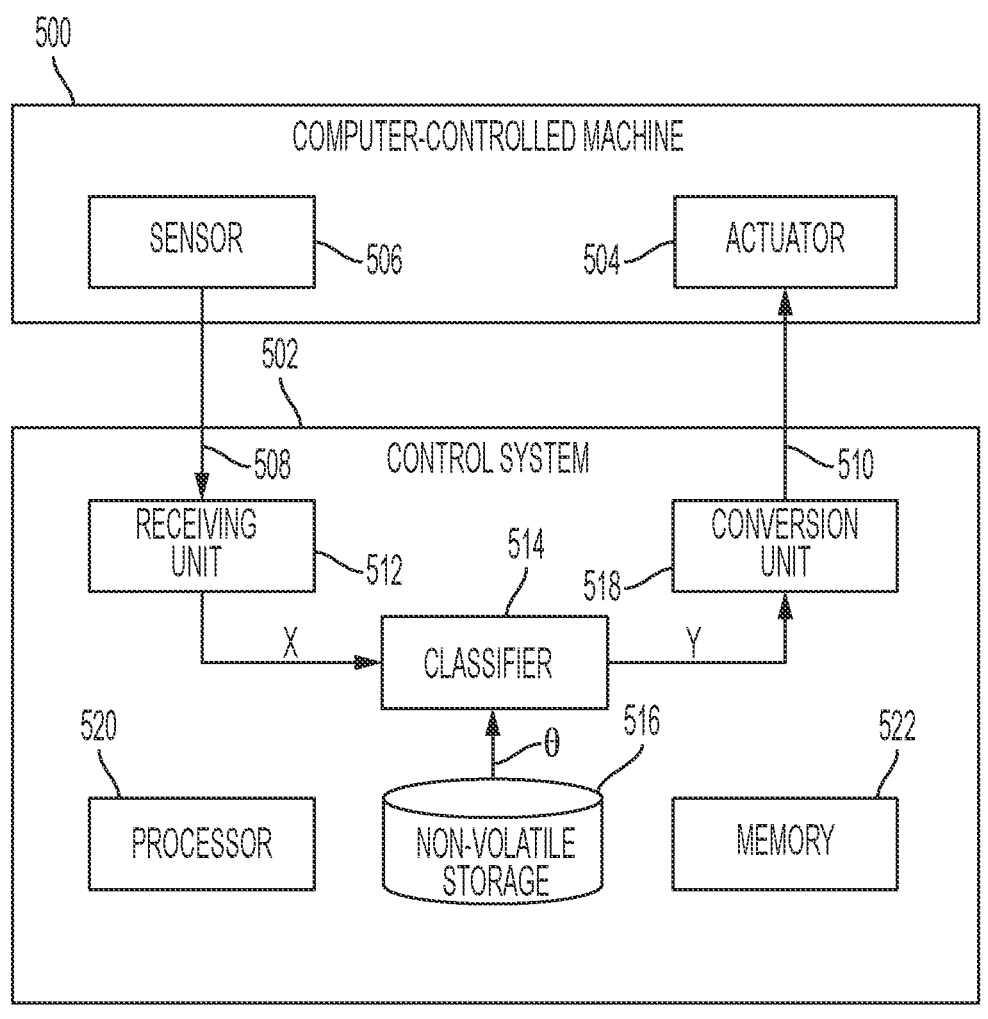
FIG. 5 depicts a schematic diagram of an interaction between a computer-controlled machine and a control system, according to the principles of the present disclosure.

FIG. 5 depicts a schematic diagram of an interaction between computer-controlled machine 500 and control system 502. Computer-controlled machine 500 includes actuator 504 and sensor 506. Actuator 504 may include one or more actuators and sensor 506 may include one or more sensors. Sensor 506 is configured to sense a condition of computer-controlled machine 500. Sensor 506 may be configured to encode the sensed condition into sensor signals 508 and to transmit sensor signals 508 to control system 502. Non-limiting examples of sensor 506 include video, radar, LiDAR, ultrasonic and motion sensors. In some embodiments, sensor 506 is an optical sensor configured to sense optical images of an environment proximate to computer-controlled machine 500.

Control system 502 is configured to receive sensor signals 508 from computer-controlled machine 500. As set forth below, control system 502 may be further configured to compute actuator control commands 510 depending on the sensor signals and to transmit actuator control commands 510 to actuator 504 of computer-controlled machine 500.

As shown in FIG. 5, control system 502 includes receiving unit 512. Receiving unit 512 may be configured to receive sensor signals 508 from sensor 506 and to transform sensor signals 508 into input signals x. In an alternative embodiment, sensor signals 508 are received directly as input signals x without receiving unit 512. Each input signal x may be a portion of each sensor signal 508. Receiving unit 512 may be configured to process each sensor signal 508 to product each input signal x. Input signal x may include data corresponding to an image recorded by sensor 506.

Control system 502 includes classifier 514. Classifier 514 may be configured to classify input signals x into one or more labels using a machine-learning (ML) algorithm, such as a neural network described above. Classifier 514 is configured to be parametrized by parameters, such as those described above (e.g., parameter θ). Parameters θ may be stored in and provided by non-volatile storage 516. Classifier 514 is configured to determine output signals y from input signals x. Each output signal y includes information that assigns one or more labels to each input signal x. Classifier 514 may transmit output signals y to conversion unit 518. Conversion unit 518 is configured to covert output signals y into actuator control commands 510. Control system 502 is configured to transmit actuator control commands 510 to actuator 504, which is configured to actuate computer-controlled machine 500 in response to actuator control commands 510. In some embodiments, actuator 504 is configured to actuate computer-controlled machine 500 based directly on output signals y.

Upon receipt of actuator control commands 510 by actuator 504, actuator 504 is configured to execute an action corresponding to the related actuator control command 510. Actuator 504 may include a control logic configured to transform actuator control commands 510 into a second actuator control command, which is utilized to control actuator 504. In one or more embodiments, actuator control commands 510 may be utilized to control a display instead of or in addition to an actuator.

In some embodiments, control system 502 includes sensor 506 instead of or in addition to computer-controlled machine 500 including sensor 506. Control system 502 may also include actuator 504 instead of or in addition to computer-controlled machine 500 including actuator 504.

As shown in FIG. 5, control system 502 also includes processor 520 and memory 522. Processor 520 may include one or more processors. Memory 522 may include one or more memory devices. The classifier 514 (e.g., ML algorithms) of one or more embodiments may be implemented by control system 502, which includes non-volatile storage 516, processor 520 and memory 522.

Non-volatile storage 516 may include one or more persistent data storage devices such as a hard drive, optical drive, tape drive, non-volatile solid-state device, cloud storage or any other device capable of persistently storing information. Processor 520 may include one or more devices selected from high-performance computing (HPC) systems including high-performance cores, microprocessors, microcontrollers, digital signal processors, microcomputers, central processing units, field programmable gate arrays, programmable logic devices, state machines, logic circuits, analog circuits, digital circuits, or any other devices that manipulate signals (analog or digital) based on computer-executable instructions residing in memory 522. Memory 522 may include a single memory device or a number of memory devices including, but not limited to, random access memory (RAM), volatile memory, non-volatile memory, static random access memory (SRAM), dynamic random access memory (DRAM), flash memory, cache memory, or any other device capable of storing information.

Processor 520 may be configured to read into memory 522 and execute computer-executable instructions residing in non-volatile storage 516 and embodying one or more ML algorithms and/or methodologies of one or more embodiments. Non-volatile storage 516 may include one or more operating systems and applications. Non-volatile storage 516 may store compiled and/or interpreted from computer programs created using a variety of programming languages and/or technologies, including, without limitation, and either alone or in combination, Java, C, C++, C#, Objective C, Fortran, Pascal, Java Script, Python, Perl, and PL/SQL.

Upon execution by processor 520, the computer-executable instructions of non-volatile storage 516 may cause control system 502 to implement one or more of the ML algorithms and/or methodologies as disclosed herein. Non-volatile storage 516 may also include ML data (including data parameters) supporting the functions, features, and processes of the one or more embodiments described herein.

The program code embodying the algorithms and/or methodologies described herein is capable of being individually or collectively distributed as a program product in a variety of different forms. The program code may be distributed using a computer readable storage medium having computer readable program instructions thereon for causing a processor to carry out aspects of one or more embodiments. Computer readable storage media, which is inherently non-transitory, may include volatile and non-volatile, and removable and non-removable tangible media implemented in any method or technology for storage of information, such as computer-readable instructions, data structures, program modules, or other data. Computer readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store the desired information and which can be read by a computer. Computer readable program instructions may be downloaded to a computer, another type of programmable data processing apparatus, or another device from a computer readable storage medium or to an external computer or external storage device via a network.

Computer readable program instructions stored in a computer readable medium may be used to direct a computer, other types of programmable data processing apparatus, or other devices to function in a particular manner, such that the instructions stored in the computer readable medium produce an article of manufacture including instructions that implement the functions, acts, and/or operations specified in the flowcharts or diagrams. In certain alternative embodiments, the functions, acts, and/or operations specified in the flowcharts and diagrams may be re-ordered, processed serially, and/or processed concurrently consistent with one or more embodiments. Moreover, any of the flowcharts and/or diagrams may include more or fewer nodes or blocks than those illustrated consistent with one or more embodiments.

The processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

Figure 6:
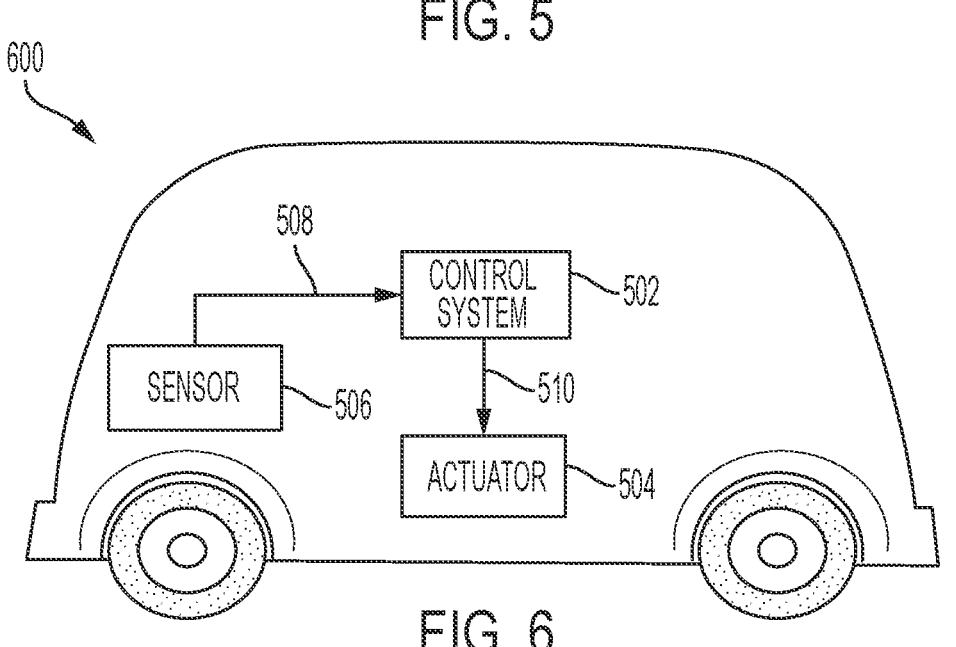
FIG. 6 depicts a schematic diagram of the control system of FIG. 5 configured to control a vehicle, which may be a partially autonomous vehicle, a fully autonomous vehicle, a partially autonomous robot, or a fully autonomous robot, according to the principles of the present disclosure.

FIG. 6 depicts a schematic diagram of control system 502 configured to control vehicle 600, which may be an at least partially autonomous vehicle or an at least partially autonomous robot. Vehicle 600 includes actuator 504 and sensor 506. Sensor 506 may include one or more video sensors, cameras, radar sensors, ultrasonic sensors, LiDAR sensors, and/or position sensors (e.g. GPS). One or more of the one or more specific sensors may be integrated into vehicle 600. Alternatively or in addition to one or more specific sensors identified above, sensor 506 may include a software module configured to, upon execution, determine a state of actuator 504. One non-limiting example of a software module includes a weather information software module configured to determine a present or future state of the weather proximate vehicle 600 or other location.

Classifier 514 of control system 502 of vehicle 600 may be configured to detect objects in the vicinity of vehicle 600 dependent on input signals x. In such an embodiment, output signal y may include information characterizing the vicinity of objects to vehicle 600. Actuator control command 510 may be determined in accordance with this information. The actuator control command 510 may be used to avoid collisions with the detected objects.

In some embodiments, the vehicle 600 is an at least partially autonomous vehicle, actuator 504 may be embodied in a brake, a propulsion system, an engine, a drivetrain, or a steering of vehicle 600. Actuator control commands 510 may be determined such that actuator 504 is controlled such that vehicle 600 avoids collisions with detected objects. Detected objects may also be classified according to what classifier 514 deems them most likely to be, such as pedestrians or trees. The actuator control commands 510 may be determined depending on the classification. In a scenario where an adversarial attack may occur, the system described above may be further trained to better detect objects or identify a change in lighting conditions or an angle for a sensor or camera on vehicle 600.

In some embodiments where vehicle 600 is an at least partially autonomous robot, vehicle 600 may be a mobile robot that is configured to carry out one or more functions, such as flying, swimming, diving and stepping. The mobile robot may be an at least partially autonomous lawn mower or an at least partially autonomous cleaning robot. In such embodiments, the actuator control command 510 may be determined such that a propulsion unit, steering unit and/or brake unit of the mobile robot may be controlled such that the mobile robot may avoid collisions with identified objects.

In some embodiments, vehicle 600 is an at least partially autonomous robot in the form of a gardening robot. In such embodiment, vehicle 600 may use an optical sensor as sensor 506 to determine a state of plants in an environment proximate vehicle 600. Actuator 504 may be a nozzle configured to spray chemicals. Depending on an identified species and/or an identified state of the plants, actuator control command 510 may be determined to cause actuator 504 to spray the plants with a suitable quantity of suitable chemicals.

Vehicle 600 may be an at least partially autonomous robot in the form of a domestic appliance. Non-limiting examples of domestic appliances include a washing machine, a stove, an oven, a microwave, or a dishwasher. In such a vehicle 600, sensor 506 may be an optical sensor configured to detect a state of an object which is to undergo processing by the household appliance. For example, in the case of the domestic appliance being a washing machine, sensor 506 may detect a state of the laundry inside the washing machine. Actuator control command 510 may be determined based on the detected state of the laundry.

Figure 7:
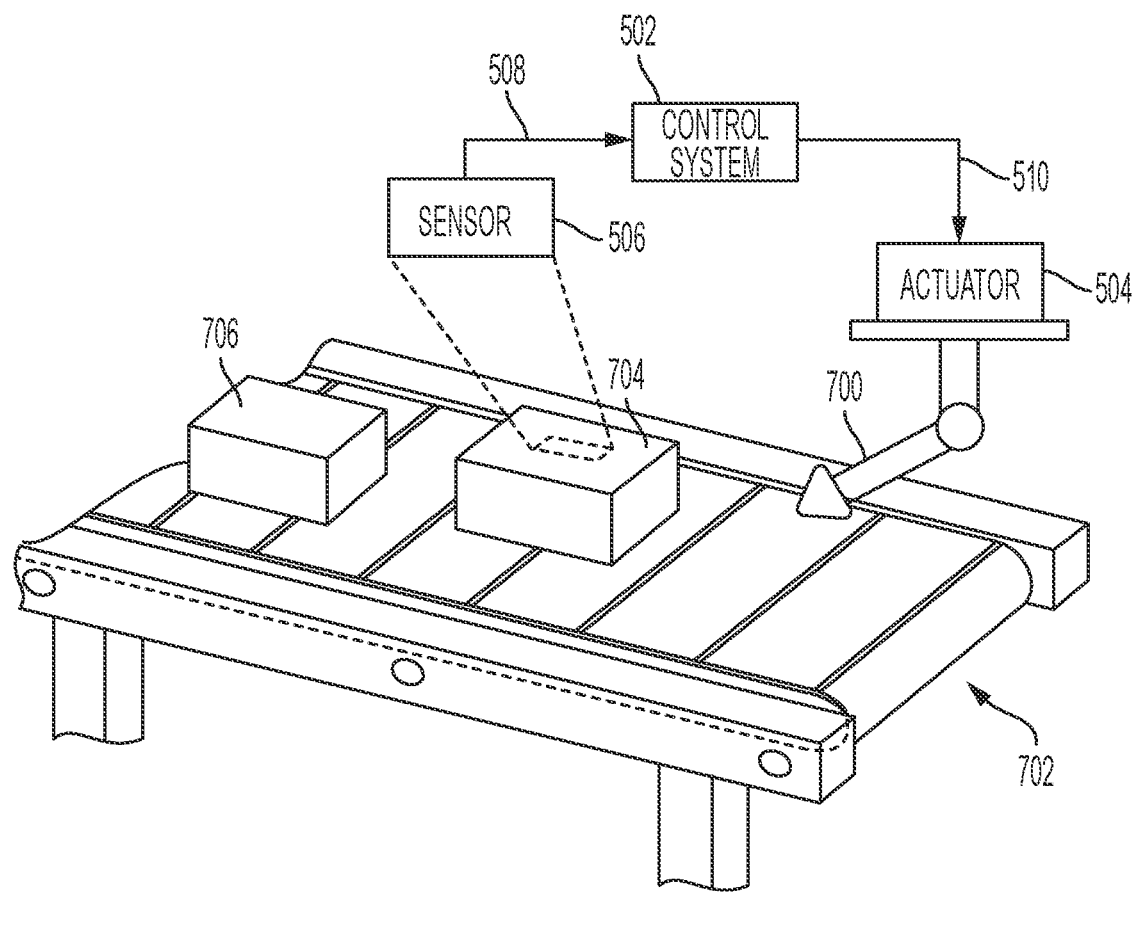
FIG. 7 depicts a schematic diagram of the control system of FIG. 5 configured to control a manufacturing machine, such as a punch cutter, a cutter or a gun drill, of a manufacturing system, such as part of a production line.

FIG. 7 depicts a schematic diagram of control system 502 configured to control system 700 (e.g., manufacturing machine), such as a punch cutter, a cutter or a gun drill, of manufacturing system 702, such as part of a production line. Control system 502 may be configured to control actuator 504, which is configured to control system 700 (e.g., manufacturing machine).

Sensor 506 of system 700 (e.g., manufacturing machine) may be an optical sensor configured to capture one or more properties of manufactured product 704. Classifier 514 may be configured to determine a state of manufactured product 704 from one or more of the captured properties. Actuator 504 may be configured to control system 700 (e.g., manufacturing machine) depending on the determined state of manufactured product 704 for a subsequent manufacturing step of manufactured product 704. The actuator 504 may be configured to control functions of system 700 (e.g., manufacturing machine) on subsequent manufactured product 706 of system 700 (e.g., manufacturing machine) depending on the determined state of manufactured product 704.

Figure 8:
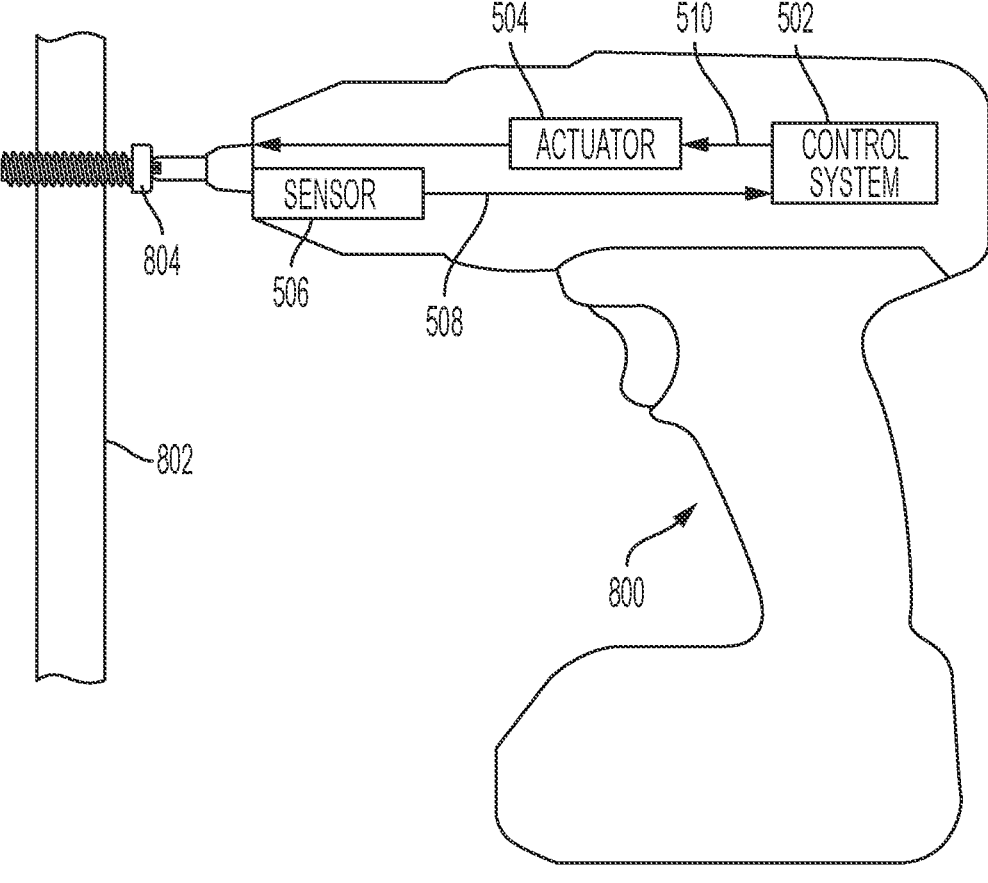
FIG. 8 depicts a schematic diagram of the control system of FIG. 5 configured to control a power tool, such as a power drill or driver that has an at least partially autonomous mode.

FIG. 8 depicts a schematic diagram of control system 502 configured to control power tool 800, such as a power drill or driver, that has an at least partially autonomous mode. Control system 502 may be configured to control actuator 504, which is configured to control power tool 800.

Sensor 506 of power tool 800 may be an optical sensor configured to capture one or more properties of work surface 802 and/or fastener 804 being driven into work surface 802. Classifier 514 may be configured to determine a state of work surface 802 and/or fastener 804 relative to work surface 802 from one or more of the captured properties. The state may be fastener 804 being flush with work surface 802. The state may alternatively be hardness of work surface 802. Actuator 504 may be configured to control power tool 800 such that the driving function of power tool 800 is adjusted depending on the determined state of fastener 804 relative to work surface 802 or one or more captured properties of work surface 802. For example, actuator 504 may discontinue the driving function if the state of fastener 804 is flush relative to work surface 802. As another non-limiting example, actuator 504 may apply additional or less torque depending on the hardness of work surface 802.

Figures 9, 10:
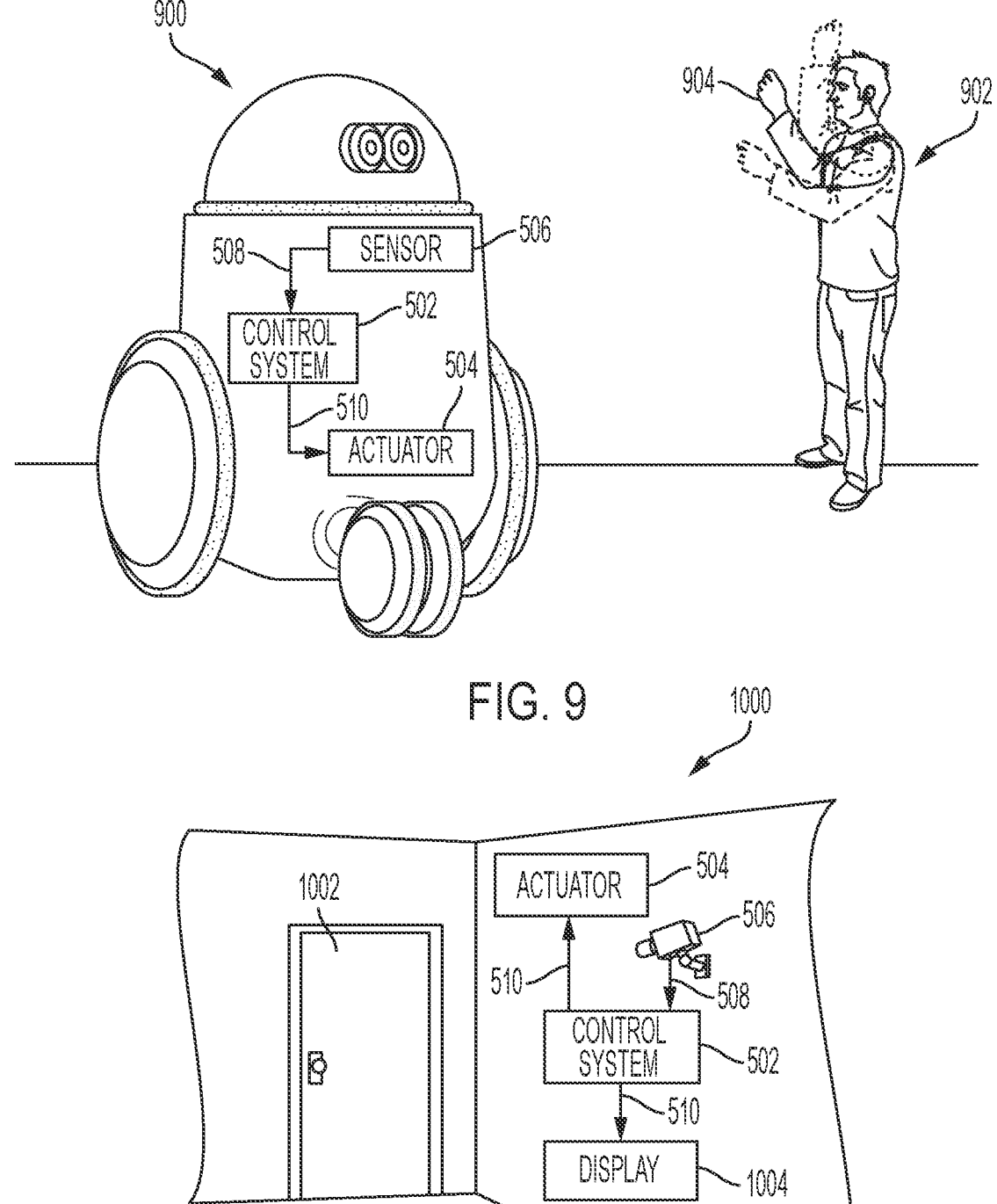
FIG. 9 depicts a schematic diagram of the control system of FIG. 5 configured to control an automated personal assistant.
FIG. 10 depicts a schematic diagram of the control system of FIG. 5 configured to control a monitoring system, such as a control access system or a surveillance system.

FIG. 9 depicts a schematic diagram of control system 502 configured to control automated personal assistant 900. Control system 502 may be configured to control actuator 504, which is configured to control automated personal assistant 900. Automated personal assistant 900 may be configured to control a domestic appliance, such as a washing machine, a stove, an oven, a microwave or a dishwasher.

Sensor 506 may be an optical sensor and/or an audio sensor. The optical sensor may be configured to receive video images of gestures 904 of user 902. The audio sensor may be configured to receive a voice command of user 902.

Control system 502 of automated personal assistant 900 may be configured to determine actuator control commands 510 configured to control system 502. Control system 502 may be configured to determine actuator control commands 510 in accordance with sensor signals 508 of sensor 506. Automated personal assistant 900 is configured to transmit sensor signals 508 to control system 502. Classifier 514 of control system 502 may be configured to execute a gesture recognition algorithm to identify gesture 904 made by user 902, to determine actuator control commands 510, and to transmit the actuator control commands 510 to actuator 504. Classifier 514 may be configured to retrieve information from non-volatile storage in response to gesture 904 and to output the retrieved information in a form suitable for reception by user 902.

FIG. 10 depicts a schematic diagram of control system 502 configured to control monitoring system 1000. Monitoring system 1000 may be configured to physically control access through door 1002. Sensor 506 may be configured to detect a scene that is relevant in deciding whether access is granted. Sensor 506 may be an optical sensor configured to generate and transmit image and/or video data. Such data may be used by control system 502 to detect a person's face.

Classifier 514 of control system 502 of monitoring system 1000 may be configured to interpret the image and/or video data by matching identities of known people stored in non-volatile storage 516, thereby determining an identity of a person. Classifier 514 may be configured to generate and an actuator control command 510 in response to the interpretation of the image and/or video data. Control system 502 is configured to transmit the actuator control command 510 to actuator 504. In this embodiment, actuator 504 may be configured to lock or unlock door 1002 in response to the actuator control command 510. In some embodiments, a non-physical, logical access control is also possible.

Monitoring system 1000 may also be a surveillance system. In such an embodiment, sensor 506 may be an optical sensor configured to detect a scene that is under surveillance and control system 502 is configured to control display 1004. Classifier 514 is configured to determine a classification of a scene, e.g. whether the scene detected by sensor 506 is suspicious. Control system 502 is configured to transmit an actuator control command 510 to display 1004 in response to the classification. Display 1004 may be configured to adjust the displayed content in response to the actuator control command 510. For instance, display 1004 may highlight an object that is deemed suspicious by classifier 514. Utilizing an embodiment of the system disclosed, the surveillance system may predict objects at certain times in the future showing up.

Figure 11:
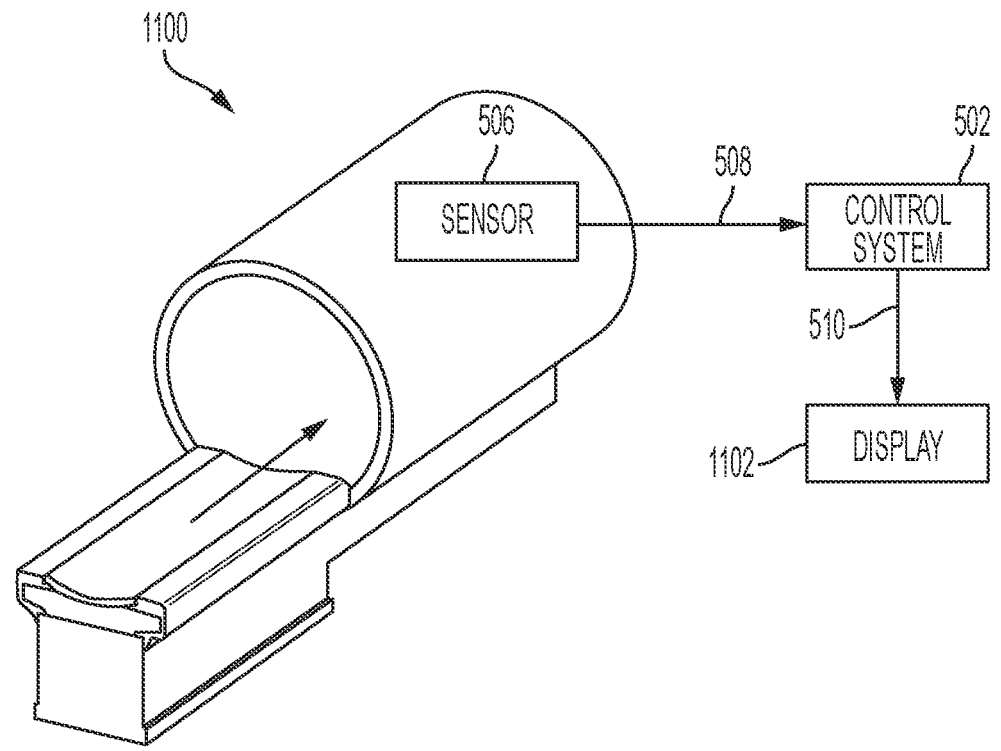
FIG. 11 depicts a schematic diagram of the control system of FIG. 5 configured to control an imaging system, for example an MM apparatus, x-ray imaging apparatus or ultrasonic apparatus.

FIG. 11 depicts a schematic diagram of control system 502 configured to control imaging system 1100, for example an MRI apparatus, x-ray imaging apparatus or ultrasonic apparatus. Sensor 506 may, for example, be an imaging sensor. Classifier 514 may be configured to determine a classification of all or part of the sensed image. Classifier 514 may be configured to determine or select an actuator control command 510 in response to the classification obtained by the trained neural network. For example, classifier 514 may interpret a region of a sensed image to be potentially anomalous. In this case, actuator control command 510 may be determined or selected to cause display 1102 to display the imaging and highlighting the potentially anomalous region.

In some embodiments, a method for multimodal question answering using artificial intelligence includes, at a first machine-learning model: receiving input dialog captured by at least one input mechanism, the input dialog including a text string corresponding to at least one question; extracting, using at least one functional map, at least one keyword from the text string; generating at least one action prediction based on an input state representation and the at least one keyword; providing, to a second machine-learning model, one or more sub-questions associated with the at least one question; receiving, from the second machine-learning model, one or more answers to the one or more sub-questions; generating at least one sub-goal based on the one or more answers; traversing an environment associated with the first machine-learning model based on the at least one sub-goal; receiving one or more images associated with the environment; predicting, using the one or more images, an answer to the at least one question; and providing, at an output mechanism, the answer to the at least one question.

In some embodiments, the at least one functional map corresponds to a neural functional approximator. In some embodiments, the at least one functional map correlates one or more maps associated with one or more image inputs with corresponding region and object labels. In some embodiments, the one or more image inputs includes one or more of a red-green-blue input, a depth information input, and a semantic segmentation input. In some embodiments, traversing the environment associated with the first machine-learning model based on the at least one sub-goal is further based on at least one downstream episodic reward. In some embodiments, the output mechanism includes at least of a visual output mechanism and an audio output mechanism and wherein the at least one input mechanism includes at least one of a microphone and a keyboard. In some embodiments, the method also includes storing, in an associated memory, at least, the text string, the answered to the at least one question, and the at least one sub-goal. In some embodiments, the method also includes receiving feedback in response to providing, at the output mechanism, the answer to the at least one question. In some embodiments, the method also includes training the first machine-learning model based on the feedback. In some embodiments, the first machine-learning model is associated with a robot that is at least partially autonomous.

In some embodiments, a system for multimodal question answering using artificial intelligence includes a processor and a memory. The memory includes instructions that, when executed by the processor, cause the processor to use a first machine-learning model to: receive input dialog, the input dialog including a text string corresponding to at least one question; extract, using at least one functional map, at least one keyword from the text string; generate at least one action prediction based on an input state representation and the at least one keyword; provide, to a second machine-learning model, one or more sub-questions associated with the at least one question; generate at least one sub-goal based on one or more answers received responsive to the one or more sub-questions; traverse an environment associated with the first machine-learning model based on the at least one sub-goal; receive one or more images associated with the environment; and predict, using the one or more images, an answer to the at least one question.

In some embodiments, the at least one functional map corresponds to a neural functional approximator. In some embodiments, the at least one functional map correlates one or more maps associated with one or more image inputs with corresponding region and object labels. In some embodiments, the one or more image inputs includes one or more of a red-green-blue input, a depth information input, and a semantic segmentation input. In some embodiments, traversing the environment associated with the first machine-learning model based on the at least one sub-goal is further based on at least one downstream episodic reward. In some embodiments, the instructions further cause the processor to store, in an associated memory, at least, the text string, the answered to the at least one question, and the at least one sub-goal. In some embodiments, the instructions further cause the processor to receive feedback in response to providing, at an output mechanism, the answer to the at least one question. In some embodiments, the instructions further cause the processor to train the first machine-learning model based on the feedback. In some embodiments, the first machine-learning model is associated with a robot that is at least partially autonomous.

In some embodiments, an autonomous apparatus includes a processor and a memory. The memory includes instructions that, when executed by the processor, cause the processor to use a first machine-learning model initially trained using first training data to: receive input dialog, the input dialog including a text string corresponding to at least one question; extract, using at least one functional map that correlates one or more maps associated with one or more image inputs with corresponding region and object labels, at least one keyword from the text string; generate at least one action prediction based on an input state representation and the at least one keyword; provide, to a second machine-learning model, one or more sub-questions associated with the at least one question; generate at least one sub-goal based on one or more answers received responsive to the one or more sub-questions; traverse an environment associated with the first machine-learning model based on the at least one sub-goal; receive one or more images associated with the environment; predict, using the one or more images, an answer to the at least one question; receive, responsive to providing the answer to the at least one question at an output mechanism, feedback associated with the answer to the at least one question; and train the first machine-learning model using second training data, the second training data being based on the first training data and at least the feedback associated with the answer to the at least one question.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for multimodal question answering using artificial intelligence, the method comprising, at a first machine-learning model:

receiving input dialog captured by at least one input mechanism in electrical communication with a robot, the input dialog including a text string corresponding to at least one question;

extracting, using at least one functional map, at least one keyword from the text string, wherein the at least one functional map is a map of a geospatial scene, wherein the first machine-learning model is trained on a plurality of geospatial scenes representing physical environments, and wherein the robot is configured to physically interact with a physical environment and manipulate physical objects in the physical environment;

generating at least one action prediction based on an input state representation and the at least one keyword;

providing, to a second machine-learning model, a plurality of sub-questions associated with the at least one question;

receiving, from the second machine-learning model, one or more answers to the plurality of sub-questions;

retrieving at least one other keyword relevant to at least one other question having an associated similarity score indicating that the at least one other question is within a threshold similarity of the at least one question;

retrieving, from a memory storing dialog history of prior questions, the at least one other question relevant to the first question based on the associated similarity score;

generating at least one sub-goal based on the one or more answers and at least one other answer associated with the at least one other keyword, wherein the at least one sub-goal is generated based on a comparison of the at least one sub-goal to at least one other sub-goal associated with the at least one other question, wherein the at least one sub-goal modifies a planned trajectory based on a comparison of similarity scores obtained from a comparison of the at least one sub-goal and object labels from a current visual context of the robot;

controlling at least one aspect of the robot to traverse an environment associated with the first machine-learning model based on the at least one sub-goal;

receiving, using one or more image capturing mechanisms in electrical communication with the robot, one or more images associated with the environment;

predicting, using the one or more images, an answer to the at least one question; and providing, at an output mechanism, the answer to the at least one question.

2. The method of claim 1, wherein the at least one functional map corresponds to a neural functional approximator.

3. The method of claim 1, wherein the at least one functional map correlates one or more maps associated with one or more image inputs with corresponding region and object labels.

4. The method of claim 3, wherein the one or more image inputs includes one or more of a red-green-blue input, a depth information input, and a semantic segmentation input.

5. The method of claim 1, wherein traversing the environment associated with the first machine-learning model based on the at least one sub-goal is further based on at least one downstream episodic reward.

6. The method of claim 1, wherein the output mechanism includes at least of a visual output mechanism and an audio output mechanism and wherein the at least one input mechanism includes at least one of a microphone and a keyboard.

7. The method of claim 1, further comprising storing, in an associated memory, at least, the text string, the answered to the at least one question, and the at least one sub-goal.

8. The method of claim 1, further comprising receiving feedback in response to providing, at the output mechanism, the answer to the at least one question.

9. The method of claim 8, further comprising training the first machine-learning model based on the feedback.

10. The method of claim 1, wherein the robot is at least partially autonomous.

11. A system for multimodal question answering using artificial intelligence, the system comprising:

a processor; and a memory including instructions that, when executed by the processor, cause the processor to:

use a first machine-learning model to:

receive input dialog from at least one input mechanism in electrical communication with a robot, the input dialog including a text string corresponding to at least one question;

extract, using at least one functional map, at least one keyword from the text string, wherein the at least one functional map is a map of a geospatial scene, wherein the first machine-learning model is trained on a plurality of geospatial scenes representing physical environments, and wherein the robot is configured to physically interact with a physical environment and manipulate physical objects in the physical environment;

generate at least one action prediction based on an input state representation and the at least one keyword;

provide, to a second machine-learning model, a plurality of sub-questions associated with the at least one question;

retrieve at least one other keyword relevant to at least one other question having an associated similarity score indicating that the at least one other question is within a threshold similarity of the at least one question;

retrieve, from a memory storing dialog history of prior questions, the at least one other question relevant to the first question based on the associated similarity score;

generate at least one sub-goal based on the one or more answers received responsive to the plurality of sub questions and based on at least one other answer associated with the at least one other question, wherein the at least one sub-goal is generated based on a comparison of the at least one sub-goal to at least one other sub-goal associated with the at least one other question, wherein the at least one sub-goal modifies a planned trajectory based on a comparison of similarity scores obtained from a comparison of the at least one sub-goal and object labels from a current visual context of the robot;

control at least one aspect of the robot to traverse an environment associated with the first machine-learning model based on the at least one sub-goal;

receive, using one or more image capturing mechanisms in electrical communication with the robot, one or more images associated with the environment; and predict, using the one or more images, an answer to the at least one question.

12. The system of claim 11, wherein the at least one functional map corresponds to a neural functional approximator.

13. The system of claim 11, wherein the at least one functional map correlates one or more maps associated with one or more image inputs with corresponding region and object labels.

14. The system of claim 13, wherein the one or more image inputs includes one or more of a red-green-blue input, a depth information input, and a semantic segmentation input.

15. The system of claim 11, wherein traversing the environment associated with the first machine-learning model based on the at least one sub-goal is further based on at least one downstream episodic reward.

16. The system of claim 11, wherein the instructions further cause the processor to store, in an associated memory, at least, the text string, the answered to the at least one question, and the at least one sub-goal.

17. The system of claim 11, wherein the instructions further cause the processor to receive feedback in response to providing, at an output mechanism, the answer to the at least one question.

18. The system of claim 17, wherein the instructions further cause the processor to train the first machine-learning model based on the feedback.

19. The system of claim 11, wherein the robot is at least partially autonomous.

20. An autonomous apparatus comprising:

a processor; and a memory including instructions that, when executed by the processor, cause the processor to use a first machine-learning model initially trained using first training data to:

receive input dialog from at least one input mechanism in electrical communication with a robot, the input dialog including a text string corresponding to at least one question;

extract, using at least one functional map, at least one keyword from the text string, wherein the at least one functional map is a map of a geospatial scene, wherein the first machine-learning model is trained on a plurality of geospatial scenes representing physical environments, and wherein the robot is configured to physically interact with a physical environment and manipulate physical objects in the physical environment;

generate at least one action prediction based on an input state representation and the at least one keyword;

provide, to a second machine-learning model, a plurality of sub-questions associated with the at least one question;

retrieve at least one other keyword relevant to at least one other question having an associated similarity score indicating that the at least one other question is within a threshold similarity of the at least one question;

retrieve, from a memory storing dialog history of prior questions, the at least one other question relevant to the first question based on the associated similarity score;

generate at least one sub-goal based on the one or more answers received responsive to the plurality of sub questions and based on at least one other answer associated with the at least one other question, wherein the at least one sub-goal is generated based on a comparison of the at least one sub-goal to at least one other sub-goal associated with the at least one other question, wherein the at least one sub-goal modifies a planned trajectory based on a comparison of similarity scores obtained from a comparison of the at least one sub-goal and object labels from a current visual context of the robot;

control at least one aspect of the robot to traverse an environment associated with the first machine-learning model based on the at least one sub-goal;

receive, using one or more image capturing mechanisms in electrical communication with the robot, one or more images associated with the environment; and predict, using the one or more images, an answer to the at least one question;

receive, responsive to providing the answer to the at least one question at an output mechanism, feedback associated with the answer to the at least one question; and train the first machine-learning model using second training data, the second training data being based on the first training data and at least the feedback associated with the answer to the at least one question.

* * * * *